(12) United States Patent
Bandholz et al.

(10) Patent No.: US 8,051,231 B2
(45) Date of Patent: Nov. 1, 2011

(54) DATA COMMUNICATIONS AMONG ELECTRONIC DEVICES WITHIN A COMPUTER

(75) Inventors: Justin P. Bandholz, Cary, NC (US);
Kevin S. D. Vernon, Durham, NC (US);
Philip L. Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 12/266,236

(22) Filed: Nov. 6, 2008

(65) Prior Publication Data

US 2010/0115165 A1 May 6, 2010

(51) Int. Cl.
*G06F 13/42* (2006.01)
*G06F 13/12* (2006.01)
*H04L 12/66* (2006.01)

(52) U.S. Cl. ............................ 710/105; 710/62; 370/463
(58) Field of Classification Search .................. 710/305, 710/306, 311, 315, 104, 105, 62, 63, 65; 370/463, 466
See application file for complete search history.

(56) References Cited

U.S. PATENT DOCUMENTS

| | | | |
|---|---|---|---|
| 5,890,015 A | 3/1999 | Garney et al. | |
| 6,198,920 B1 | 3/2001 | Doviak et al. | |
| 7,020,121 B2 * | 3/2006 | Hardacker et al. | 370/338 |
| 7,028,114 B1 | 4/2006 | Milan et al. | |
| 7,225,282 B1 * | 5/2007 | Lyle | 710/105 |
| 2005/0235159 A1 * | 10/2005 | Anandakumar et al. | 713/185 |
| 2006/0092959 A1 * | 5/2006 | Unger | 370/412 |
| 2006/0203804 A1 | 9/2006 | Whitmore et al. | |
| 2006/0209892 A1 | 9/2006 | MacMullan et al. | |
| 2007/0248328 A1 * | 10/2007 | Khan et al. | 386/96 |
| 2009/0006677 A1 * | 1/2009 | Rofougaran | 710/63 |
| 2009/0034788 A1 * | 2/2009 | Sim et al. | 382/100 |
| 2009/0198859 A1 * | 8/2009 | Orishko et al. | 710/313 |
| 2009/0247222 A1 * | 10/2009 | Bonnat | 455/557 |

* cited by examiner

*Primary Examiner* — Mark Rinehart
*Assistant Examiner* — Trisha Vu
(74) *Attorney, Agent, or Firm* — Brandon C. Kennedy; Cynthia G. Seal; Biggers & Ohanian, LLP

(57) ABSTRACT

Data communications among electronic devices within a computer, including transmitting, from a transmitting device to a first translation device, data communications encoded according to an unreliable wireline data communications protocol; translating, by the first translation device, the data communications from the encoding of the unreliable wireline data communications protocol to an encoding of a reliable wireless data communications protocol; transmitting, by the first translation device to a second translation device, the data communications according to the reliable wireless data communications protocol; translating, by the second translation device, the data communications from the encoding of the reliable wireless data communications protocol to the encoding of the unreliable wireline data communications protocol; and transmitting, by the second translation device to a receiving device, the data communications according to the unreliable wireline data communications protocol.

15 Claims, 7 Drawing Sheets

```
┌─────────────────────────────────────────────────────────────────┐
│ Transmit, From A Transmitting Device To A First Translation Device, Data Communications │
│   Encoded According To An Unreliable Wireline Data Communications Protocol              │
│                                    202                                                   │
└─────────────────────────────────────────────────────────────────┘
                                        │
                                        ▼
┌─────────────────────────────────────────────────────────────────┐
│ Translate, By The First Translation Device, The Data Communications From The Encoding │
│ Of The Unreliable Wireline Data Communications Protocol To An Encoding Of A Reliable  │
│                        Wireless Data Communications Protocol                           │
│                                    204                                                 │
└─────────────────────────────────────────────────────────────────┘
                                        │
                                        ▼
┌─────────────────────────────────────────────────────────────────┐
│ Transmit, By The First Translation Device To A Second Translation Device, The Data │
│   Communications According To The Reliable Wireless Data Communications Protocol   │
│                                    206                                              │
└─────────────────────────────────────────────────────────────────┘
                                        │
                                        ▼
┌─────────────────────────────────────────────────────────────────┐
│ Translate, By The Second Translation Device, The Data Communications From The │
│ Encoding Of The Reliable Wireless Data Communications Protocol To The Encoding Of │
│         The Unreliable Wireline Data Communications Protocol                       │
│                                    208                                             │
└─────────────────────────────────────────────────────────────────┘
                                        │
                                        ▼
┌──────────────────────────────────────────────┐
│ Transmit, By The Second Translation Device To A Receiving │
│   Device, The Data Communications According To The        │
│     Unreliable Wireline Data Communications Protocol      │
│                       210                                  │
└──────────────────────────────────────────────┘
                                        │
                                        ▼
┌──────────────────────────────────────────────┐
│ Advise, The First Translation Device By The Second        │
│ Translation Device, That The Second Translation Device, At │
│ The Behest Of The Transmitting Device, And The Receiving  │
│ Device Both Hold Low A Signal Level On A Wireline Between │
│ The Second Translation Device And The Receiving Device    │
│                       702                                  │
└──────────────────────────────────────────────┘
                                        │
                                        ▼
┌──────────────────────────────────────────────┐
│ Hold Low, By The First Translation Device, A Corresponding │
│     Wireline Between The First Translation Device And The  │
│     Transmitting Device Until The Second Translation Device │
│    Advises That The Receiving Device No Longer Holds Low The│
│      Wireline Between The Second Translation Device And The │
│                     Receiving Device                        │
│                          704                                │
└──────────────────────────────────────────────┘
```

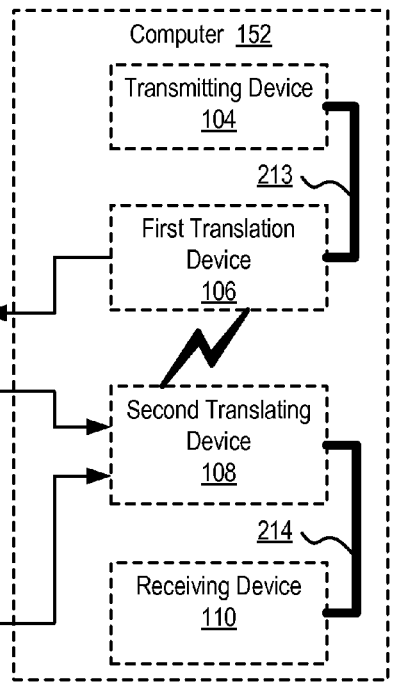

FIG. 7

DATA COMMUNICATIONS AMONG ELECTRONIC DEVICES WITHIN A COMPUTER

BACKGROUND OF THE INVENTION

1. Field of the Invention

The field of the invention is data processing, or, more specifically, methods, apparatus, and products for data communications among electronic devices within a computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer systems have become increasingly complex an increasing number of internal devices such as, for example, microcontrollers, low-speed peripherals, temperature, fan, or voltage sensors, have been incorporated into modern computers. Such devices are often coupled for data communications via an unreliable wireline data communications bus such as, for example, an Inter-Integrated Circuit ('$I^2C$') wireline data communications bus that implements the $I^2C$ bus protocol. The $I^2C$ bus protocol is a serial computer bus protocol for connecting electronic components inside a computer that was first published in 1982 by Philips. Although the $I^2C$ bus protocol is well-known and widely-popular, the $I^2C$ bus protocol does have certain limitations. Because of the simple design of the $I^2C$ bus protocol, the $I^2C$ protocol does not support error checking such as, for example, parity checking, cyclic redundancy checking, error-correcting codes, and so on. Implementing data communications using the $I^2C$ bus protocol, therefore, may lead to undiscovered errors being introduced into the data transmitted over an $I^2C$ wireline data communications bus. Such undiscovered errors may cause a computer system to malfunction or produce incorrect results.

SUMMARY OF THE INVENTION

Methods, apparatus, and computer program products are described for data communications among electronic devices within a computer, including transmitting, from a transmitting device to a first translation device, data communications encoded according to an unreliable wireline data communications protocol, the transmitting device and the first translation device being electronic components of a computer, the transmitting device coupled for data communications to the first translation device by a wireline data communications bus; translating, by the first translation device, the data communications from the encoding of the unreliable wireline data communications protocol to an encoding of a reliable wireless data communications protocol; transmitting, by the first translation device to a second translation device, the data communications according to the reliable wireless data communications protocol; translating, by the second translation device, the data communications from the encoding of the reliable wireless data communications protocol to the encoding of the unreliable wireline data communications protocol; and transmitting, by the second translation device to a receiving device, the data communications according to the unreliable wireline data communications protocol, the receiving device and the second translation device being electronic components of the computer, the receiving device coupled for data communications to the second translation device by a wireline data communications bus.

The foregoing and other objects, features and advantages of the invention will be apparent from the following more particular descriptions of example embodiments of the invention as illustrated in the accompanying drawings wherein like reference numbers generally represent like parts of example embodiments of the invention.

BRIEF DESCRIPTION OF THE DRAWINGS

FIG. 7 sets forth a flow chart illustrating a further example method of data communications among electronic devices within a computer according to embodiments of the present invention.

DETAILED DESCRIPTION OF EXEMPLARY EMBODIMENTS

Figure 1:
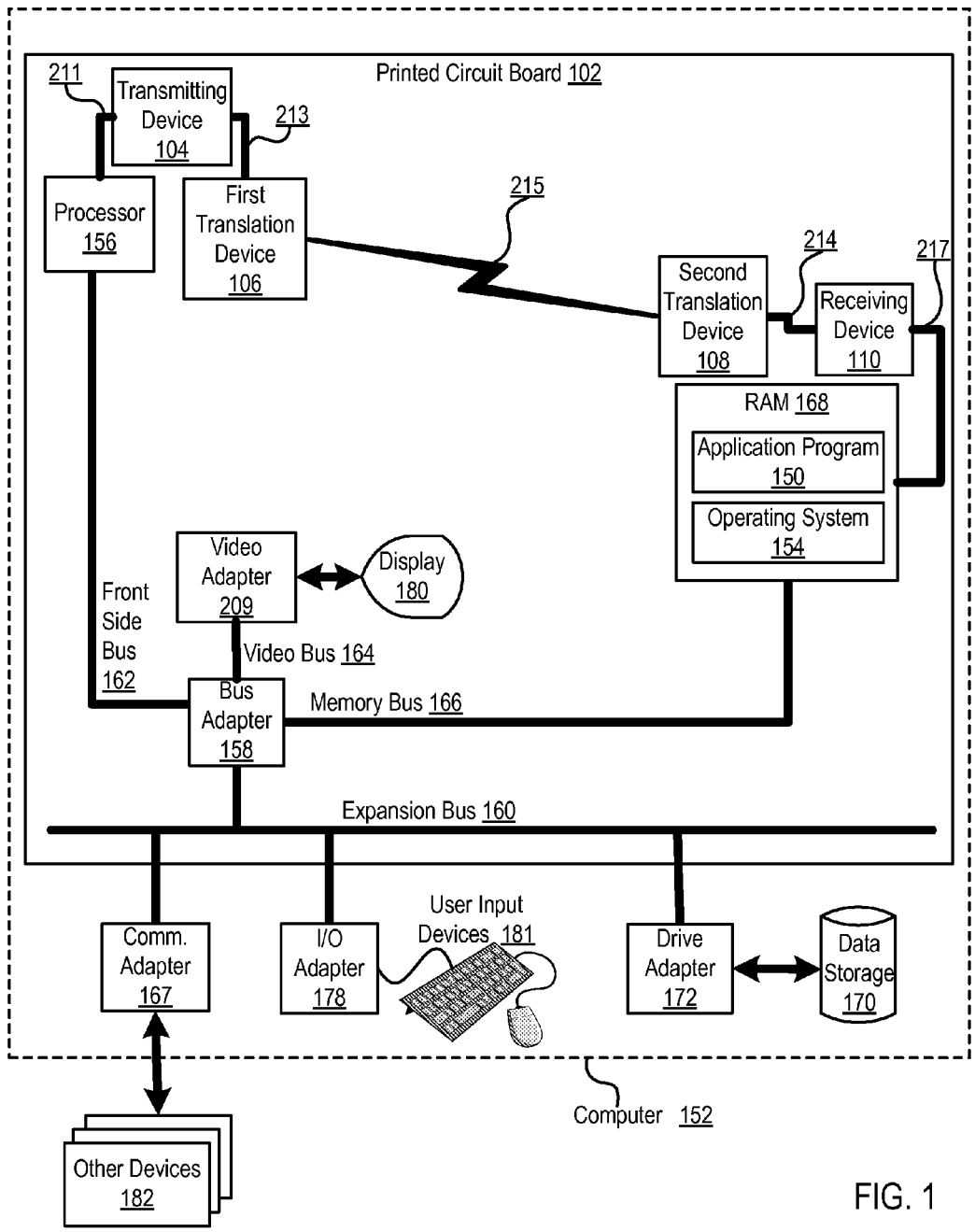
FIG. 1 sets forth a block diagram of automated computing machinery that includes an example computer useful in data communications among electronic devices within a computer according to embodiments of the present invention.

Exemplary methods, apparatus, and products for data communications among electronic devices within a computer in accordance with the present invention are described with reference to the accompanying drawings, beginning with FIG. 1. FIG. 1 sets forth a block diagram of automated computing machinery that includes an example computer (152) useful in data communications among electronic devices within a computer according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an application program (150), a module of user-level computer program instructions for performing a specific function directly for a user or, in some cases, for another application program. Examples of application programs include word processors, database programs, spreadsheets, browsers, and so on. Also stored in RAM (168) is an operating system (154). Operating systems useful data communications among electronic devices within a computer according to embodiments of the present invention include UNIX™, Linux™, Microsoft XP™, AIX™, IBM's i5/OS™, and others as will occur to those of skill in the art. The operating system (154) and the application program (150) in the example of FIG. 1 are shown in RAM (168), but many components of such software typically are stored in non-volatile memory also, such as, for example, on a disk drive (170).

The computer of FIG. 1 also includes a transmitting device (104), a receiving device (110), a first translation device (106), and a second translation device (108). The transmitting device (104) and the first translation device (106) are coupled for data communications by a wireline data communications bus (213), and the receiving device (110) and the second translation device (108) are coupled for data communications by a wireline data communications bus (214). The wireline data communications buses (213, 214) may optionally be the same kind of wireline data communications bus, or not. A wireline data communications bus (213, 214) is a subsystem that facilitates data communications between computer components inside a computer or between computers over one or more wires. In the example apparatus of FIG. 1, a wireline data communications bus may be embodied, for example, as an I²C bus, a Serial Peripheral Interface ('SPI') bus, a System Management Bus ('SMBus'), a IEEE 1149.1 ('JTAG') boundary scan bus, or as any other wireline bus as may occur to those of skill in the art. Data communications over these wireline data communications buses (213, 214) are carried out according to an unreliable data communications protocol. Such protocols are unreliable in the sense that the protocol does not ensure that data will be delivered intact or delivered at all. An unreliable wireline data communications protocol is unreliable in the sense that the protocol presents an attempt to deliver data but provides no mechanism to verify data arrives without error.

In the example apparatus of FIG. 1, the transmitting device (104) and the receiving device (110) can be implemented as any device capable of data communications over a wireline data communications bus according to an unreliable data communications protocol. Whether a particular device is a transmitting device or a receiving device is a matter of usage. As a practical matter, it is common for a wireline bus and an unreliable protocol to be bidirectional, so that any device connected to the bus for communications can both transmit and receive. In such a context, whether a particular device is referred to as a 'transmitter' or as a 'receiver' depends on its role or function at a particular point in time, whether the device is presently sending or receiving. Such transmitting devices and receiving devices may be implemented as, for example, microprocessors, microcontrollers, low-speed peripherals, special purpose sensors, ADCs, DACs, memory modules, I/O modules, power supplies, system clocks, and other devices as will occur to those of skill in the art. Such transmitting devices and receiving devices may includes, for further examples, I²C master devices, I²C slave devices, a JTAG boundary scan device, an SPI master device, an SPI slave device, an SMBus master device, an SMBus slave device, and so on. The transmitting device (104) and the receiving device (110) in this example are coupled also through wireline buses (211, 217) to the computer processor (156) and the RAM (168) respectively, so that the transmitting device and the receiving device can exchange instructions or operating information, for example, between the computer processor (156) and the RAM (168). In the example of FIG. 1, the transmitting device (104) and the receiving device (110) are shown, with respect to the processor (156) and the RAM (168), as separate devices, although in other example embodiments, the transmitting device or the receiving device will be incorporated into another device, such as, for example, a processor, a memory module, and so on.

A translation device (106) is an automated electronic device composed of synchronous or asynchronous logic and electrical interconnections capable of translating data communications encoded in one data communications protocol into data communications encoded in another communications protocol, including translating data communications between an unreliable wireline data communications protocol encoding and a reliable wireless data communications protocol encoding. Such a translation device can include a serial interface for connecting to a wireline data communications bus, translation logic that carries out encodings from one protocol to another, and a differential pair or single wire interface for wireless data communications. Data communications according to embodiments of the present invention typically is carried out by use of two or more translation devices, so that, for clarity of explanation in this specification, a translation device is sometimes referred to as a 'first' translation device or a 'second' translation device. The use of the terms 'first' and 'second,' however, is only an aid to explanation, not a technical feature of apparatus that carries out data communications according to embodiments of the present invention.

A translation device (106, 108) is an automated electronic device composed of synchronous or asynchronous logic and electrical interconnections capable of translating data communications encoded in one data communications protocol into data communications encoded in another communications protocol. Such a translation device can include a serial interface for connecting to a wireline data communications bus, translation logic that carries out encodings from one protocol to another, and a differential pair or single wire interface for wireless data communications. Data communications according to embodiments of the present invention typically are carried out by use of two or more translation devices, so that, for clarity of explanation in this specification, a translation device is sometimes referred to as a 'first' translation device or a 'second' translation device. The use of the terms 'first' and 'second,' however, is only an aid to explanation, not a technical feature of apparatus that carries out data communications according to embodiments of the present invention. In the example of FIG. 1, each translation device (106, 108) is coupled for data communications over a wireless data communications connection (215). A wireless connection may be implemented, for example, as a Wireless USB connection, a wireless TCP/IP connection, or in any way as will occur to those of skill in the art.

The transmitting device (104), the receiving device (110), the first translation device (106), and the second translation device (108) are disposed within the computer on a printed circuit board ('PCB') (102) along with the processor, the RAM module, a bus adapter, a video adapter, and several buses (162, 166, 160, 164), as well as other components of the computer not illustrated here. The processor (156) and the RAM module (168) communicate with one another through the transmitting device (104) and the receiving device (110), but the processor and the RAM module are widely separated from one another on the PCB (102). Without the wireless connection (215) provided by the translation devices (106, 108) according to embodiments of the present invention, the transmitting device and the receiving device would be connected, along with other devices, by a large-topology wireline bus (using an unreliable protocol) that would include multiple drops, tees, and switches, greatly increasing the likelihood of communications failures.

The transmitting device (104), the receiving device (110), the first translation device (106), and the second translation device (108) operate together to carry out data communications among electronic devices within the computer (152), according to embodiments of the present invention, in this fashion: The transmitting device transmits to the first translation device data communications encoded according to an unreliable wireline data communications protocol. Such data communication can include, for example, operating instructions from a processor to a RAM module, requests for operating information directed from a processor to a RAM module, instructions from a processor to a system clock to changes speeds, instructions from a processor to a power supply to change power settings, and so on. The first translation device translates the data communications from the encoding of the unreliable wireline data communications protocol to an encoding of a reliable wireless data communications protocol. Such a translation of encoding may be represented by, for example, a translation from $I^2C$ encoding to Wireless USB encoding, from SPI encoding to Wireless Ethernet encoding, and so on. The first translation device then transmits, to the second translation device, the data communications according to the reliable wireless data communications protocol, and the second translation device translates the data communications back, from the encoding of the reliable wireless data communications protocol, to the encoding of the unreliable wireline data communications protocol. The second translation device then transmits the data communications to the receiving device according to the unreliable wireline data communications protocol.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data communications among electronic devices within a computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other devices (182). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data communications among electronic devices within a computer according to embodiments of the present invention include modems for wired dial-up communications, Ethernet (IEEE 802.3) adapters for wired data communications network communications, and 802.11 adapters for wireless data communications network communications.

The arrangement of devices making up the automated computing machinery illustrated in FIG. 1 is for explanation, not for limitation. Automated computing machinery useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
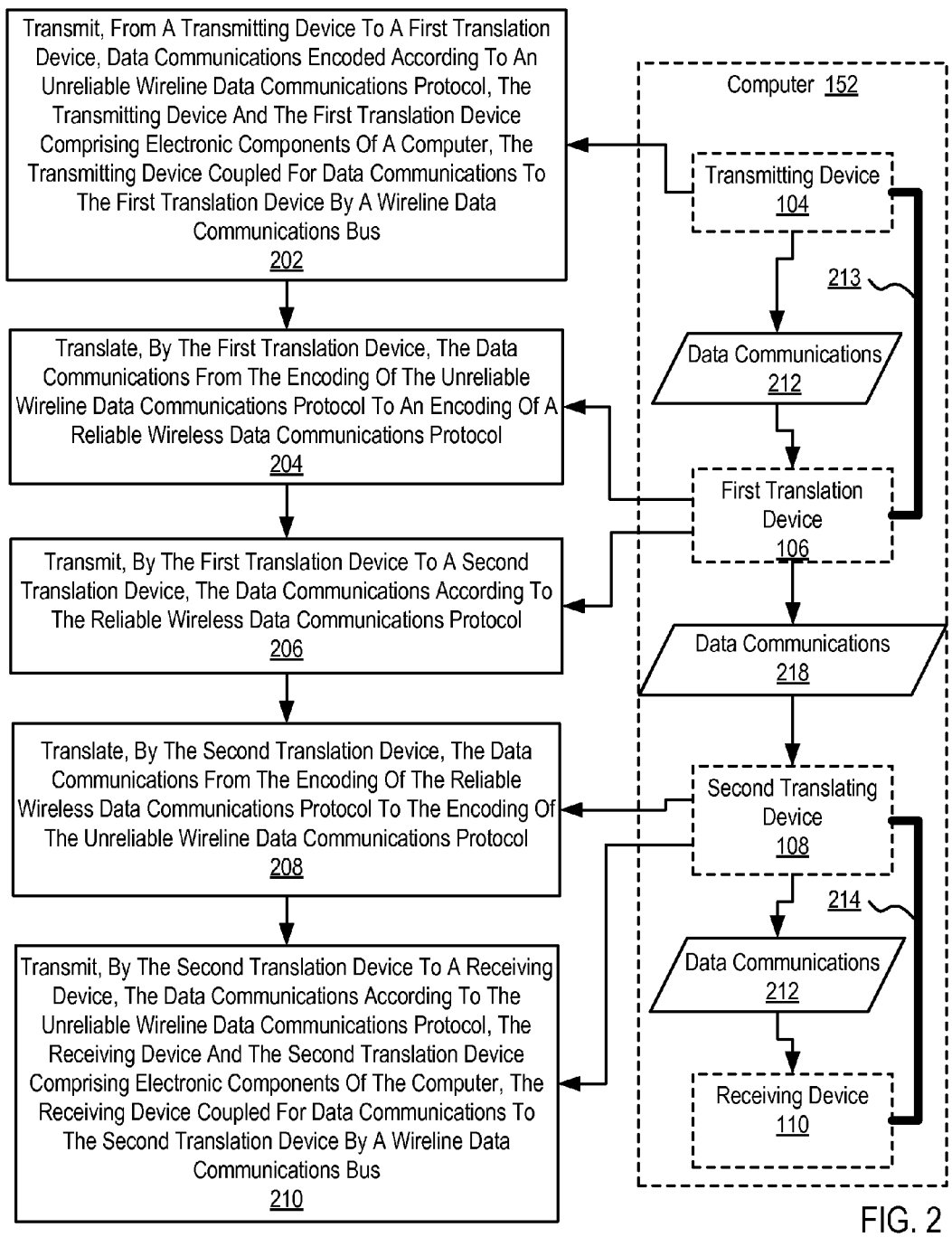
FIG. 2 sets forth a flow chart illustrating an example method of data communications among electronic devices within a computer according to embodiments of the present invention.

For further explanation, FIG. 2 sets forth a flow chart illustrating an example method of data communications among electronic devices within a computer (152) according to embodiments of the present invention. The term "computer" is used here in the broad sense of automated computing machinery, including, for example, motherboards on personal computers or laptops, personal digital assistants, motherboards on blade servers and other servers, computer components on embedded systems, cellular phones, other automated handheld devices, and so on, as will occur to those of skill in the art. Such a computer (152) can be, for example, similar to the one described above with reference to FIG. 1. The electronic devices within the computer are connected together through an administrative, low-bandwidth network, such as, for example, $I^2C$ or SMBus, that is improved by inclusion of translation devices for wireless data communications according to embodiments of the present invention by inclusion. The administrative, low-bandwidth network, such as $I^2C$ or SMBus, is referred to in this specification as a wireline data communications bus.

The method of FIG. 2 includes transmitting (202), from a transmitting device (104) to a first translation device (106), data communications (212) encoded according to an unreliable wireline data communications protocol, to the first translation device by a wireline data communications bus (213). In the method of FIG. 2, the transmitting device (104) and the first translation device (106) are electronic components of a computer (152), where the transmitting device is coupled for data communications to the first translation device by a wireline data communications bus (213). As described above with reference to FIG. 1, a wireline data communications bus is a subsystem that facilitates data communications between computer components inside a computer or between computers over one or more wires. In this example, data communications (212) over such wireline data communications buses are carried out according to an unreliable data communications protocol.

The method of FIG. 2 includes translating (204), by the first translation device (106), the data communications (212) from the encoding of the unreliable wireline data communications protocol to an encoding of a reliable wireless data communications protocol. A reliable wireless data communications protocol is a protocol that implements at least some mechanism to verify that data is communicated without transmission errors, corruption, tampering, incorrect bits, dropped packets, and so on. Such mechanisms for message security include checksums, encryption, sequence numbering of packets within a message, and so on. Examples of reliable wireless protocols include Wireless USB, TCP/IP over wireless Ethernet, and so on. Verifying that data arrived without error can be carried out, for example, by including a checksum in a data transmission. A checksum is generated by adding numeric values of components of a message and storing the total as a 'checksum.' The recipient of data communications can verify that data arrived without error by performing the same operation on the message and comparing the result to the checksum. If the result of addition by the recipient matches the checksum, the recipient concludes that the message arrived without corruption during transmission.

In the method of FIG. 2, translating the data communications from the encoding of the unreliable wireline data communications protocol to an encoding of a reliable wireless data communications protocol is carried out by the first translation device (106), which is capable of data communications according to the unreliable wireline data communications protocol and also capable of data communications according to the reliable wireless data communications protocol. The first translation device (106) carries out such a translation by decoding data communications (212) encoded in the unreliable wireline data communications protocol into a sequence of digital bits. Such a sequence of digital bits is subsequently encoded by the first translation device (106) according to a reliable wireless data communications protocol such that the sequence of digital bits is preserved but encoded according to a different data communications protocol.

The method of FIG. 2 includes transmitting (206), by the first translation device (106) to a second translation device (108), the data communications (218) according to the reliable wireless data communications protocol. In the method of FIG. 2, transmitting data can be carried out, for example, by the first translation device (106) initiating a wireless data communications session with the second translation device (108) and sending the translated data communications (218) to the second translation device during the data communications session. Because the translated data communications is sent over a reliable wireless data communications protocol, the data communications (218) is checked for errors such as, for example, bit corruption or packet loss. If an error is detected, a number of actions may be taken in response including retransmitting the data communications from the first translation device (106) to the second translation device (108).

The method of FIG. 2 includes translating (208), by the second translation device (108), the data communications (218) from the encoding of the reliable wireless data communications protocol to the encoding of the unreliable wireline data communications protocol. In the method of FIG. 2, the second translation device (108) is capable of data communications according to the unreliable wireline data communications protocol and also capable of data communications according to the reliable wireless data communications protocol. The second translation device (108) carries out such a translation by decoding data communications (218) encoded in the reliable wireless data communications protocol into a sequence of digital bits. Such a sequence of digital bits is subsequently encoded by the second translation device according to the unreliable wireline data communications protocol such that the sequence of digital bits is preserved but encoded according to a different data communications protocol.

The method of FIG. 2 includes transmitting (210), by the second translation device (108) to a receiving device (110), the data communications (212) according to the unreliable wireline data communications protocol. In the method of FIG. 2, the receiving device (110) and the second translation device (108) are electronic components of the computer (152), the receiving device coupled for data communications to the second translation device by a wireline data communications bus (214). In the method of FIG. 2, transmitting data can be carried out, for example, by the second translation device (108) initiating a wireline data communications session with the receiving device (110) and sending the translated data communications (212) to the receiving device during the data communications session. Because the translated data communications is sent over an unreliable wireless data communications protocol, the data communications is not checked for errors.

Figure 3:
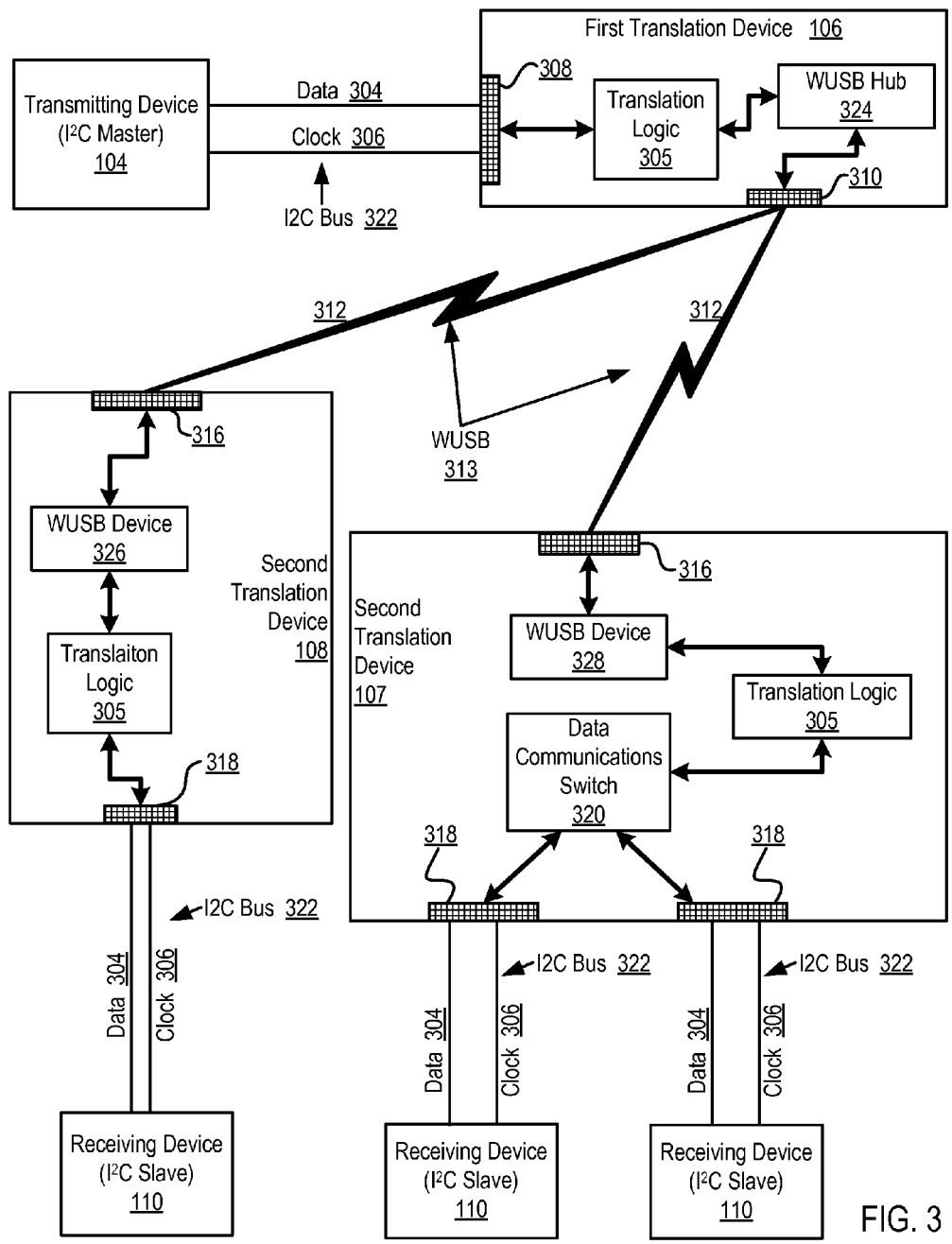
FIG. 3 sets forth a functional block diagram illustrating an arrangement of devices capable of carrying out an example method of data communications among electronic devices within a computer according to embodiments of the present invention.

For further explanation, FIG. 3 sets forth a functional block diagram illustrating an arrangement of devices capable of carrying out data communications among electronic devices within a computer according to embodiments of the present invention. The example of FIG. 3 is similar to the example of FIG. 1, including as it does, a transmitting device (104), a receiving device (110), a first translation device (106), and a second translation device (107, 108). The transmitting device (104) and the receiving devices (110) are connected to the translation devices (106, 107, 108) by wireline buses (322). In this example, the wireline buses (322) are I²C buses, and the transmitting device (104) and the receiving devices (110) are, respectively, an I²C master device and I²C slave devices. In the example of FIG. 3, each translation device (106, 107, 108) includes translation logic (305). Translation logic (305) is synchronous or asynchronous logic circuitry configured to translate data communications between encodings according to unreliable wireline data communications protocols and encodings according to reliable wireless data communications protocols. Translation logic (305) may be embodied as a field-programmable gate arrays ('FPGAs'), complex programmable logic devices ('CPLDs'), application specific integrated circuits ('ASICs'), and in other ways as will occur to those of skill in the art. In the example of FIG. 3, one of the translation devices (107) includes a data communications switch (320). A data communications switch (320) is programmable logic capable of routing data communications to one or more of the devices (110) connected to a translation device (107) that includes such a data communications switch In the example of FIG. 3, the wireline data communications bus is an I²C bus. An I²C bus is a wireline data communications bus that includes two bidirectional open-drain lines that carry information among devices connected to the bus, a serial data line (304) and a serial clock line (306). In this example, the fact that translation devices exist in the data path between an I²C slave and an I²C master is completely transparent to both the slave and the master. From the perspective of the master (104), signals on a bus (322) between the master and a translation device (106) are transmitted directly to and received directly a slave device (104); and, from the perspective of a slave device (110), signals on a bus (322) between a slave device and a translation device (107, 108) are transmitted directly to and received directly from a master device (104). The intervening translation and transmission according to a reliable protocol is completely unknown to the transmitting (104) and receiving devices (110), in this example, an I²C master and I²C slaves. Data to be transferred between the transmitting device (104) and the first translation device (106) is placed on the data line (304) which must be stable when the clock line (306) is in the HIGH voltage state. In the example of FIG. 3, the state of the data line can only change when the clock signal on the clock line is LOW. In the example of FIG. 3, bits of data to be transferred between the transmitting device (104) and the first translation device (106) can be represented, for example, by the HIGH and LOW voltage states on the data line (304).

In the example of FIG. 3, data communications on the I2C buses are carried out according to the I²C protocol, an unreliable wireline data communications protocol. The I²C bus protocol is a serial computer bus protocol for connecting electronic components inside a computer that is unreliable in the sense that it does supports no form of error checking, including, for example, parity checking, cyclic redundancy checking, error-correcting codes, and so on. Implementing data communications connections using the I²C bus protocol, therefore, may lead to undiscovered errors being introduced into the data transmitted through an I²C data communications connection. Moreover, as distances between slaves and master increase on modern, complex PCBs, with multiple drops among devices on the same bus, T-intersections, additional intervening switch devices, and so on, data communications with an unreliable protocol become even more unreliable. In an embodiment like the example of FIG. 3, the complex intervening bus structures are replaced with a wireless transmission medium (312), more reliable than a complex wireline bus, upon which is utilized a reliable data communication protocol.

The example apparatus of FIG. 3, implements a reliable wireless data communications protocol as the Wireless Universal Serial Bus ('WUSB') protocol (313). The WUSB protocol is a short-range wireless radio communication protocol that governs the connection, communication, and data transfer between a WUSB hub and WUSB devices. The WUSB protocol includes, for example, regulations regarding the formatting of WUSB packets and requirements regarding flow control between communicating devices. Each translation device (106, 107, 108) includes either a WUSB Hub (324) or a WUSB device (326, 328). Each WUSB Hub (324) and WUSB device (326, 328) receives data communications through WUSB wireless links (312) according to the WUSB data communications protocol and hands off all such communications to a module of translation logic (305) for translation to I²C encoding. Each WUSB Hub (324) and WUSB device (326, 328) receives from a module of translation logic (305) data communications that have been translated to WUSB encoding from I²C encoding and transmits those data communications through the WUSB wireless links (312) according to the WUSB data communications protocol.

In the example of FIG. 3, the transmitting device (104) is an I²C master device and the receiving device (110) is an I²C slave device. An I²C master device is a device capable of data communications over an I²C bus (322) that initiates data communications by sending a start bit. Such a master device identifies a slave device (110) with which it wishes to initiate communication. An I²C slave device (110) is a device capable of receiving data communications over an I²C bus (322) in response to the master device's request to initiate data communications with the slave device. Such a slave device (110) begins communications with a master device by responding with an ACK bit in response to a master device's request to initiate data communications with the slave device.

In the example of FIG. 3, the first translation device (106) exposes an I²C slave interface (308) to the transmitting device (104) and a second translation device (107, 108) exposes an I²C master interface (316) to the receiving device (110). An I²C slave interface includes a set of pins that enables a master device to physically connect to the data line (304) and the clock line (306) of an I²C bus (322). Through such a physical connection, the I²C master device is able to affect line level changes to the state of the data line (304) and clock line (306) such as, for example, affecting a change in the voltage level across each line. An I²C master interface (318) is a set of pins that enables a slave device to physically connect to the data line (304) and the clock line (306) of an I²C bus (322). Through such a physical connection, the I²C slave device is able to affect line level changes to the state of data line (304) and clock line (306) such as, for example, affecting a change in the voltage level across the data line (304) and clock line (306).

In the example of FIG. 3, the first translation device (106) exposes a wireless USB hub interface (310) to a second translation device (107, 108) and a second translation device exposes a wireless USB spoke interface (316) to the first translation device. Wireless USB is a logical bus that supports data communications between a host device and one or more peripherals. A wireless USB hub interface serves as a connection point through which a wireless USB device can connect to a wireless USB host. A wireless USB spoke interface serves as a connection point through which a wireless USB host can communicate with a wireless USB device. Wireless USB devices attach to a host by sending the host a message at a well defined time. The host and device then authenticate each other using unique IDs and the appropriate security keys.

In the example of FIG. 3, the transmitting device (104), the receiving device (110), the first translation device (106), and the second translation device (108) operate together to carry out data communications among electronic devices within a computer, according to embodiments of the present invention, in this fashion: The transmitting device (104), which in this example is an I²C master device, transmits to the first translation device (106), across an I²C wireline bus (322), data communications encoded according to the unreliable I²C wireline data communications protocol. The first translation device (106) receives the communications through I²C interface (308), translates, by its translation logic module (305), the data communications from the encoding of the I²C protocol to an encoding of the reliable WUSB wireless data communications protocol. The first translation device then transmits, to the second translation device, by its WUSB Hub (324) through its WUSB interface (310), the data communications according to the reliable WUSB wireless data communications protocol. A second translation device (107 or 108) translates the data communications back, from the encoding of the reliable WUSB protocol to the encoding of the unreliable I²C protocol. The second translation device then transmits the data communications, through an I²C interface (318) across an I²C bus (322), to a receiving device (110) according to the unreliable wireline data communications protocol.

Figure 4:
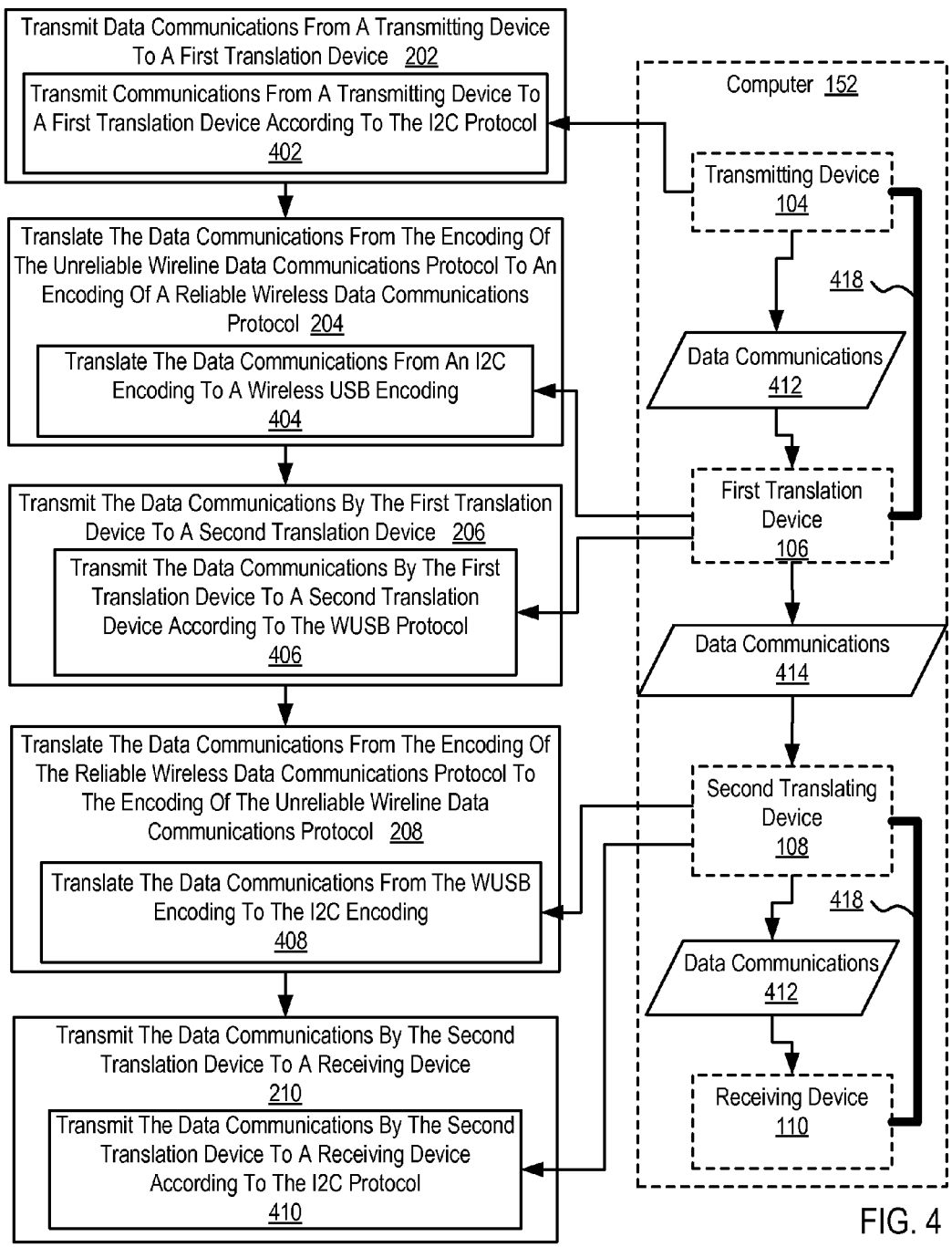
FIG. 4 sets forth a flow chart illustrating a further example method of data communications among electronic devices within a computer according to embodiments of the present invention.

For further explanation, FIG. 4 sets forth a flow chart illustrating a further example method of data communications among electronic devices within a computer according to embodiments of the present invention. The method of FIG. 4 is similar to the method of FIG. 2, including as it does transmitting (202) data communications to the first translation device, translating (204) the data communications by the first translation device, transmitting (206) the data communications to the second translation device, translating (208) the data communications by the second translation device, and transmitting (210) the data communications by the second translation device. In the method of FIG. 4, however, the unreliable wireline data communications protocol is the Inter-Integrated Circuit ('I2C') protocol, the reliable wireless data communications protocol is the Wireless Universal Serial Bus ('WUSB') protocol, and the wireline data communications buses are I2C buses.

In the method of FIG. 4, transmitting (202) data communications from a transmitting device to a first translation device includes transmitting (402) communications (412) from a transmitting device (104) to a first translation device (106) according to the $I^2C$ protocol. Data transmissions according to the $I^2C$ protocol are permitted only when the $I^2C$ bus (418) is free. The $I^2C$ bus is free when both the data line and the clock line are in the HIGH state. To initiate data transmission, the transmitting device (104) creates a START condition by pulling the data line low while the clock line remains in the HIGH state. After such a START condition has occurred, the bus is no longer free. The transmitting device (104) begins data transmission by iteratively pulling the clock line low, pulling low or releasing the data line as appropriate, and then releasing the clock line. When the transmitting device is finished with data communications, the transmitting device can create a STOP condition by transitioning the data line from the LOW state to the HIGH state while the clock line is in the HIGH state.

In the method of FIG. 4, translating (204) the data communications from the encoding of the unreliable wireline data communications protocol to an encoding of a reliable wireless data communications protocol includes translating (404) the data communications (412) from an $I^2C$ encoding to a wireless USB encoding. In the method of FIG. 4, translating the data communications (412) from an $I^2C$ encoding to a wireless USB encoding can be carried out by measuring the voltage levels across the data line and clock line and outputting a digital value that represents data communications across the data line and clock line. In an $I^2C$ encoding data values are read from the data line after the clock line transitions from the LOW state to the HIGH state. If the data line is at the HIGH state a digital '1' has been transferred. If the data line is at the LOW state a digital '0' has been transferred. After all bits of data have been received from an $I^2C$ encoded data communications session, such values are packetized according to the wireless USB protocol. The general structure of a wireless USB packet is that is contains a preamble, headers, and data which can be transmitted at a different rate than the headers.

In the method of FIG. 4, transmitting (206) the data communications by the first translation device (106) to a second translation device (108) includes transmitting the data communications (414) by the first translation device (106) to a second translation device (108) according to the WUSB protocol. Data communications (414) according to the WUSB protocol occur over channels through which bit streams are transmitted and received. Such bit streams are encoded into packets by a sender and encoded out of packets by a receiver. Transmitting the data communication by the first translation device (106) can therefore be carried out by transmitting the wireless USB packet created above over a channel to the second translation device (108). If the second translation device (108) receives the USB packet intact, the second translation device will subsequently acknowledge receipt of the packet. If the packet is not received intact, WUSB rules for recovering lost packets will be invoked. In such a way, the WUSB protocol guarantees advancement of a data stream only after reliable data delivery.

In the method of FIG. 4, translating (206) the data communications from the encoding of the reliable wireless data communications protocol to the encoding of the unreliable wireline data communications protocol includes translating (408) the data communications (412) from the WUSB encoding to the $I^2C$ encoding. Translating (408) the data communications (412) from the WUSB encoding to the $I^2C$ encoding may be carried out, for example, by translating the WUSB encoding into a sequence of bits and affecting a sequence of signal level changes according to the $I^2C$ protocol that correspond to such a sequence of bits. The second translation device (108) will initially attempt to create a START condition by pulling the data line low. After affecting such a START condition the second translation device can begin data transmission. To carry out data transmissions, the second translation device must first pull the clock line low. When the second translation device (108) has pulled the clock line to the LOW state, the second translation device can then pull the data line LOW if the second translation device is transferring a digital '0' or the second translation device can release the data line if the second translation device is transferring a '1'. The second translation device (108) must then release the clock line as the data line will be sampled by the receiving device (110) when the clock line is in the HIGH state. The second translation device (108) can continue data translation in such a manner. When all digital values have been translated into signal level transitions, the second translation device can transition the data line from the LOW state to the HIGH state while the clock line is in the HIGH state, indicating a STOP condition.

In the method of FIG. 4, transmitting (210) the data communications by the second translation device to a receiving device includes transmitting (410) the data communications (412) by the second translation device (108) to a receiving device (110) according to the $I^2C$ protocol. Data transmissions according to the $I^2C$ protocol are permitted only when the $I^2C$ bus (420) is free. The $I^2C$ bus is free when both the data line and the clock line are in the HIGH state. To initiate data transmission, the second translation device (108) creates a START condition by pulling the data line low while the clock line remains HIGH. After such a START condition has occurred, the bus is no longer free. The second translation device (108) begins data transmission by iteratively pulling the clock line low, pulling low or releasing the data line as appropriate, and then releasing the clock line. When the second translation device (108) is finished with data communications, the second translation device (108) can create a STOP condition by transitioning the data line from the LOW state to the HIGH state while the clock line is in the HIGH state.

Figure 5:
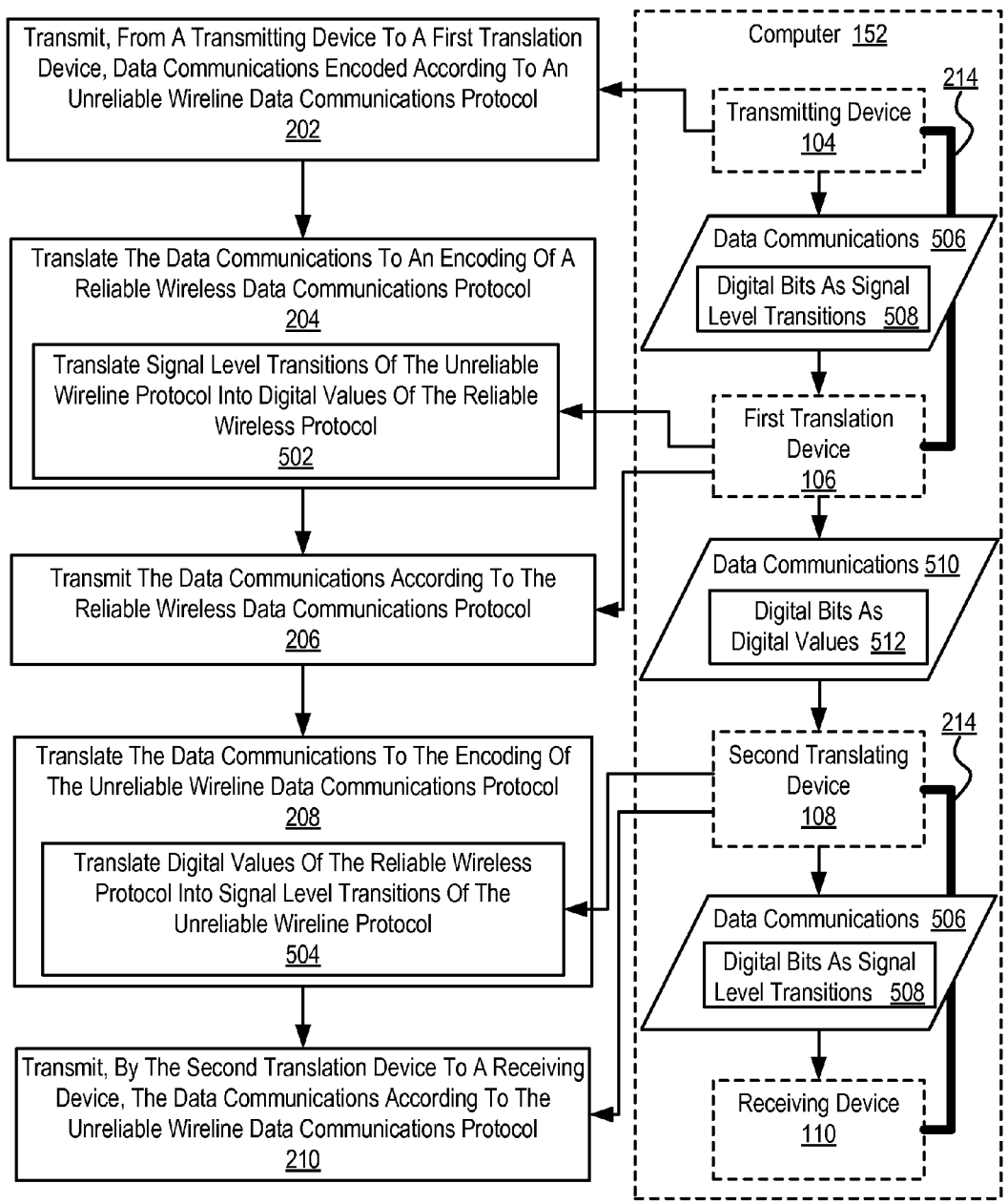
FIG. 5 sets forth a flow chart illustrating a further example method of data communications among electronic devices within a computer according to embodiments of the present invention.

For further explanation, FIG. 5 sets forth a flow chart illustrating a further example method of data communications among electronic devices within a computer according to embodiments of the present invention. The method of FIG. 5 is similar to the method of FIG. 2, including as it does transmitting (202) data communications to the first translation device (104), translating (204) the data communications by the first translation device, transmitting (206) the data communications to the second translation device (108), translating (208) the data communications by the second translation device, and transmitting (210) the data communications by the second translation device. The example method of FIG. 5, also like the method of FIG. 2, typically is implemented on a computer similar to the one described above with reference to FIG. 1. In the method of FIG. 5, however, the encoding of the unreliable wireline protocol includes an encoding of digital bits as signal level transitions (508). A signal level transition is a change to the state of a wireline including, for example, a change in the voltage level across a wireline. Encoding digital bits as signal level transitions can be carried out, for example, by changing the state of a wireline at predefined intervals to reflect a particular sequence of digital bits. For example, a voltage of 5V across a wireline may represent a bit value of 1 and a voltage of 3V across a wireline may represent a value of 0. In such an example, a digital bit sequence of '1101' can be encoded as signal level transitions by affecting voltage levels of 5V, 5V, 3V, and 5V across a wireline at successive intervals.

In the method of FIG. 5, the encoding of the reliable wireless protocol includes an encoding of digital bits as digital values (512). Such digital values may be embodied, for example, as binary values, hexadecimal values, or in any other way as will occur to those of skill in the art. Encoding digital bits as digital values can be carried out, for example, by creating a digital value that represents a sequence of digital bits. For example, if a digital bit sequence of '1101' is received, such digital bits can be encoded as a hexadecimal value of 'D'.

In the method of FIG. 5, translating (204), by the first translation device (106), the data communications (506) from the encoding of the unreliable wireline protocol to an encoding of a reliable wireless protocol includes translating (502) signal level transitions (508) of the unreliable wireline protocol into digital values of the reliable wireless protocol. In the method of FIG. 5, translating (502) signal level transitions of the unreliable wireline protocol into digital values may be carried out, for example, by measuring the voltage levels across the data line and clock line of a wireline bus (214) and outputting a digital value that represents data communications across the data line and clock line. The first translation device (106) will initially wait for a START condition from the transmitting device (104) before translating the signal level transitions. Such a START condition occurs when the data line transitions from the HIGH to LOW state at the same time that the clock line is in the HIGH state. Upon detecting such a condition, the first translation device (106) begins to translate the signal level transitions that follow. When the clock line transitions from the LOW state to the HIGH state, a bit of data is ready to be read from the data line. The first translation device (106) therefore measures the voltage level across the data line. If the data line is at the HIGH state the first translation device determines that a digital '1' has been transferred. If the data line is at the LOW state the first translation device determines that a digital '0' has been transferred. The first translation device (106) continues to detect the sequence of transmitted bits until the first translation device detects that the data line has transitioned from the LOW state to the HIGH state while the clock line is at the HIGH state, indicating a STOP condition. The first translation device (106) can then packetize such a sequence of bits into the format required by the reliable wireless protocol, including translating the digital bits as digital values (512).

In the method of FIG. 5, translating (208), by the second translation device (108), the data communications (506) from the encoding of the reliable wireless protocol to the encoding of the unreliable wireline protocol includes translating (504) digital values (512) of the reliable wireless protocol into signal level transitions (508) of the unreliable wireline protocol. In the method of FIG. 5, translating digital values into signal level transitions may be carried out, for example, by translating the digital values into a sequence of bits and affecting a sequence of signal level changes that correspond to such a sequence of bits. The second translation device (108) will initially attempt to create a START condition by pulling the data line low. After affecting such a START condition the second translation device (108) can begin data transmission. To carry out data transmissions, the second translation device (108) must first pull the clock line low. When the second translation device has pulled the clock line to the LOW state, the second translation device can then pull the data line low if the second translation device is transferring a digital '0' or the second translation device can release the data line if the second translation device is transferring a '1'. The second translation device (108) must then release the clock line as the data line will be sampled by the receiving device (110) when the clock line is in the HIGH state. The second translation device (108) can continue data translation in such a manner. When all digital values have been translated into signal level transitions, the second translation device can transition the data line from the LOW state to the HIGH state while the clock line is in the HIGH state, indicating a STOP condition.

Figure 6:
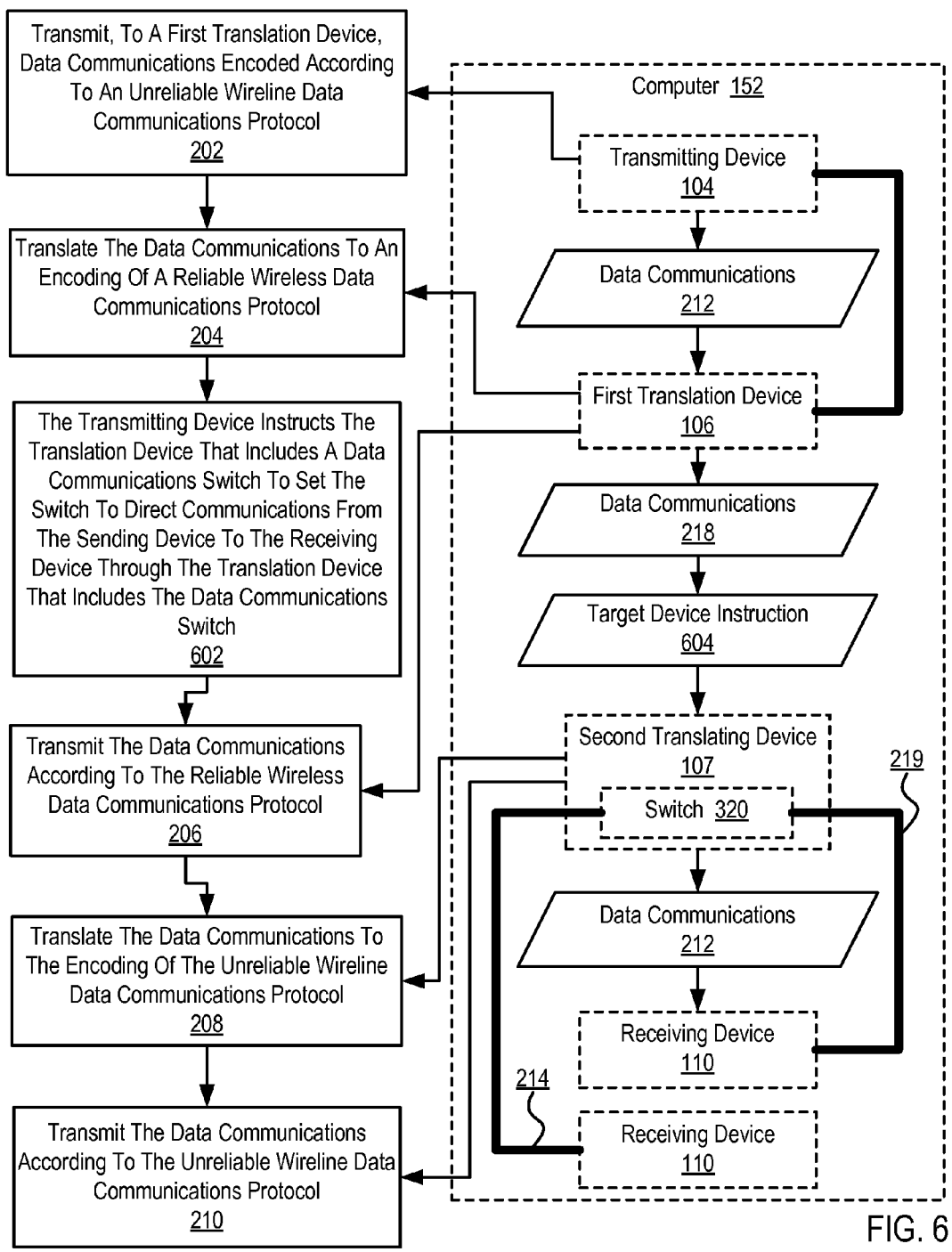
FIG. 6 sets forth a flow chart illustrating a further example method of data communications among electronic devices within a computer according to embodiments of the present invention.

For further explanation, FIG. 6 sets forth a flow chart illustrating a further example method of data communications among electronic devices within a computer according to embodiments of the present invention. The method of FIG. 6 is similar to the method of FIG. 2, including as it does transmitting (202) data communications to the first translation device (106), translating (204) the data communications (212) by the first translation device, transmitting (206) the data communications to the second translation device (108), translating (204) the data communications (218) by the second translation device, and transmitting (210) the data communications (218) by the second translation device (107). The example method of FIG. 6, also like the method of FIG. 2, typically is implemented on a computer (152) similar to the one described above with reference to FIG. 1. In the method of FIG. 6, however, at least one of the translation devices (107) includes a data communications switch (320). In the method of FIG. 6, the translation device (107) that includes a data communications switch (320) is connected to a plurality of receiving devices (110) that include the receiving device (110). In the method of FIG. 6, each of the plurality of receiving devices is separately connected to the translating device by a separate wireline data communications bus (214, 219). In the method of FIG. 6, a translation device (107) that includes a data communications switch (320) can route data communications to any of the plurality of receiving devices (110) connected to the translation device (107). The switch (320) can be implemented as an electronic multiplexer, as an address decoder, and in other ways that may occur to those of skill in the art.

In the method of FIG. 6, the transmitting device (104) instructs (602) the translation device, that is, the translation device (107) that includes a data communications switch (320), to set the switch to direct communications from the transmitting device (104) to a receiving device (110) through the translation device (107) that includes the data communications switch (302). In the method of FIG. 6, the transmitting device (104) can instruct the translation device (107) that includes a switch (320) to direct communications from the transmitting device to a particular receiving device by, for example, sending the translation device a target device instruction (604). A target device instruction (604) is a data communications message (604) instructing the translation device that any data communications received from the transmitting device should be directed to an identified receiving device until further notice. Such an instruction can include, for example, the network address or other identifier of a targeted receiving device (110).

For further explanation, FIG. 7 sets forth a flow chart illustrating a further example method of data communications among electronic devices within a computer according to embodiments of the present invention. The method of FIG. 7 is similar to the method of FIG. 2, including as it does transmitting (202) data communications to the first translation device, translating (204) the data communications by the first translation device, transmitting (206) the data communications to the second translation device, translating (208) the data communications by the second translation device, and transmitting (210) the data communications by the second translation device. The example method of FIG. 7, also like the method of FIG. 2, typically is implemented on a computer (152) similar to the one described above with reference to FIG. 1. In the method of FIG. 4, however, advising (702), the first translation device (106) by the second translation device (108), that the second translation device, at the behest of the transmitting device (104), and the receiving device (110) both hold low a signal level on a wireline data communications bus (214) between the second translation device and the receiving device. The second translation device (108) can determine that the receiving device (110) is holding the signal level on such a wireline data communications bus (214) low by, for example, monitoring the voltage level across the wireline bus (214). A receiving device (110) may pull the wireline bus (214) low, for example, to stretch a clock period when the receiving device is not yet ready to receive additional data communications. Upon determining that the receiving device (110) is holding the signal level low, the second translation device can advise (702) the first translation device (106) that the receiving device (110) is holding the signal level low by, for example, sending a message to first translation device (106).

The method of FIG. 7 also includes holding (704) low, by the first translation device (106), a corresponding wireline (213) between the first translation device and the transmitting device (104) until the second translation device (108) advises that the receiving device (110) no longer holds low the wireline (214) between the second translation device and the receiving device. By holding low the wireline (213) between the first translation device and the transmitting device (104), the first translation device (106) advises the transmitting device (104) to hold data communications for the remainder of the stretched clock period. The first translation device (214) will hold the wireline low until the second translation device (108) advises the first translation device (106) that the receiving device (110) no longer holds low the wireline (214) between the second translation device and the receiving device. The first translation device can be advised that the receiving device (110) no longer holds low the wireline (214) between the second translation device and the receiving device, for example, by receiving a message from the second translating device (108). As such, the receiving device will not receive additional data communications until the receiving device no longer holds the signal low, thereby indicating that the receiving device is ready to receive data communications.

In view of the explanations set forth above, readers will recognize that the benefits of data communications among electronic devices within a computer according to embodiments of the present invention include:

Because each transmitting and receiving device in the present application is connected directly to a translation device, wireline bus topologies are simplified as each wireline may connects a reduced number of devices— optionally as little as two devices, a translation device and a transmitting or receiving device. As such, there is reduced failure across wireline busses in the present application and communication between transmitting devices and receiving devices becomes more reliable given that wireless communications are reliable and the wireline communications are less prone to failure than in a system in which all devices are connected by a wireline bus.

The topology of wireline connections to and from transmitting and receiving devices that communicate according to embodiments of the present invention is greatly simplified for a same number of communicating devices. An entire wireline network is now interspersed with wireless segments, resulting in wireline topologies that, from the perspective of the transmitting and receiving devices, often can appear as a single wireline connection. The risk of failure in complex wireline topologies that connect many devices with multiple drops, tees, and switches is greatly reduced.

Transmitting and receiving devices that communicate data according to embodiments of the present invention can occupy the entire address space of a wireline data communications protocol—unlike prior art communications among devices within a computer where transmitting device could drive through a complex wireline topology receiving devices whose addresses occupy even a substantial portion of the address space supported by a protocol, much less the entire address space.

Example embodiments of the present invention are described largely in the context of a fully functional computer system for data communications among electronic devices within a computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data communications among electronic devices within a computer, the method comprising:

transmitting, from a transmitting device to a first translation device, data communications encoded according to an unreliable wireline data communications protocol, the transmitting device and the first translation device comprising electronic components of the computer, the transmitting device coupled for data communications to the first translation device by a wireline data communications bus;

translating, by the first translation device, the data communications from the encoding of the unreliable wireline data communications protocol to an encoding of a reliable wireless data communications protocol;

transmitting, by the first translation device to a second translation device, the data communications according to the reliable wireless data communications protocol;

translating, by the second translation device, the data communications from the encoding of the reliable wireless data communications protocol to the encoding of the unreliable wireline data communications protocol;

transmitting, by the second translation device to a receiving device, the data communications according to the unreliable wireline data communications protocol, the receiving device and the second translation device comprising electronic components of the computer, the receiving device coupled for data communications to the second translation device by a wireline data communications bus;

advising, the first translation device by the second translation device, that the second translation device, at the behest of the transmitting device, and the receiving device both hold low a signal level on a wireline between the second translation device and the receiving device; and holding low, by the first translation device, a corresponding wireline between the first translation device and the transmitting device until the second translation device advises that the receiving device no longer holds low the wireline between the second translation device and the receiving device.

2. The method of claim 1 wherein:
the unreliable wireline data communications protocol is the Inter-Integrated Circuit ('I²C') protocol, the reliable wireless data communications protocol is the Wireless Universal Serial Bus ('WUSB') protocol, and the wireline data communications bus is an I²C bus;
the transmitting device is an I²C master device and the receiving device is an I²C slave device;
the first translation device exposes an I²C slave interface to the transmitting device and the second translation device exposes an I²C master interface to the receiving device; and
the first translation device exposes a WUSB hub interface to the second translation device and the second translation device exposes a WUSB spoke interface to the first translation device.

3. The method of claim 1 wherein:
the unreliable wireline data communications protocol is the Inter-Integrated Circuit ('I²C') protocol, the reliable wireless data communications protocol is the Wireless Universal Serial Bus ('WUSB') protocol, and the wireline data communications buses are I²C buses;
transmitting data communications from a transmitting device to a first translation device further comprises transmitting communications from a transmitting device to a first translation device according to the I²C protocol;
translating the data communications from the encoding of the unreliable wireline data communications protocol to an encoding of a reliable wireless data communications protocol further comprises translating the data communications from an I²C encoding to a wireless USB encoding;

transmitting the data communications by the first translation device to a second translation device further comprises transmitting the data communications by the first translation device to a second translation device according to the WUSB protocol;

translating the data communications from the encoding of the reliable wireless data communications protocol to the encoding of the unreliable wireline data communications protocol further comprises translating the data communications from the WUSB encoding to the I²C encoding; and transmitting the data communications by the second translation device to a receiving device further comprises transmitting the data communications by the second translation device to a receiving device according to the I²C protocol.

4. The method of claim 1 wherein:
the encoding of the unreliable wireline protocol comprises an encoding of digital bits as signal level transitions;
the encoding of the reliable wireless protocol comprises an encoding of digital bits as digital values;
translating, by the first translation device, the data communications from the encoding of the unreliable wireline protocol to an encoding of a reliable wireless protocol further comprises translating signal level transitions of the unreliable wireline protocol into digital values of the reliable wireless protocol; and
translating, by the second translation device, the data communications from the encoding of the reliable wireless protocol to the encoding of the unreliable wireline protocol further comprises translating digital values of the reliable wireless protocol into signal level transitions of the unreliable wireline protocol.

5. The method of claim 1 wherein:
at least one of the translation devices includes a data communications switch, the translation device that includes a data communications switch connected to a plurality of receiving devices that include the receiving device, each of the plurality of receiving devices separately connected to the translating device by a separate wireline data communications bus; and
the method further comprises the transmitting device's instructing the translation device that includes a data communications switch to set the switch to direct communications from the transmitting device to the receiving device through the translation device that includes the data communications switch.

6. Apparatus for data communications among electronic devices within a computer, the apparatus comprising a computer processor, a computer memory operatively coupled to the computer processor, the apparatus capable of:
transmitting, from a transmitting device to a first translation device, data communications encoded according to an unreliable wireline data communications protocol, the transmitting device and the first translation device comprising electronic components of the computer, the transmitting device coupled for data communications to the first translation device by a wireline data communications bus;
translating, by the first translation device, the data communications from the encoding of the unreliable wireline data communications protocol to an encoding of a reliable wireless data communications protocol;

transmitting, by the first translation device to a second translation device, the data communications according to the reliable wireless data communications protocol;

translating, by the second translation device, the data communications from the encoding of the reliable wireless data communications protocol to the encoding of the unreliable wireline data communications protocol;

transmitting, by the second translation device to a receiving device, the data communications according to the unreliable wireline data communications protocol, the receiving device and the second translation device comprising electronic components of the computer, the receiving device coupled for data communications to the second translation device by a wireline data communications bus;

advising, the first translation device by the second translation device, that the second translation device, at the behest of the transmitting device, and the receiving device both hold low a signal level on a wireline between the second translation device and the receiving device; and holding low, by the first translation device, a corresponding wireline between the first translation device and the transmitting device until the second translation device advises that the receiving device no longer holds low the wireline between the second translation device and the receiving device.

7. The apparatus of claim 6 wherein:

the unreliable wireline data communications protocol is the Inter-Integrated Circuit ('I²C') protocol, the reliable wireless data communications protocol is the Wireless Universal Serial Bus ('WUSB') protocol, and the wireline data communications bus is an I²C bus;

the transmitting device is an I²C master device and the receiving device is an I²C slave device;

the first translation device exposes an I²C slave interface to the transmitting device and the second translation device exposes an I²C master interface to the receiving device; and the first translation device exposes a WUSB hub interface to the second translation device and the second translation device exposes a WUSB spoke interface to the first translation device.

8. The apparatus of claim 6 wherein:

the unreliable wireline data communications protocol is the Inter-Integrated Circuit ('I²C') protocol, the reliable wireless data communications protocol is the Wireless Universal Serial Bus ('WUSB') protocol, and the wireline data communications buses are I²C buses;

transmitting data communications from a transmitting device to a first translation device further comprises transmitting communications from a transmitting device to a first translation device according to the I²C protocol;

translating the data communications from the encoding of the unreliable wireline data communications protocol to an encoding of a reliable wireless data communications protocol further comprises translating the data communications from an I²C encoding to a wireless USB encoding;

transmitting the data communications by the first translation device to a second translation device further comprises transmitting the data communications by the first translation device to a second translation device according to the WUSB protocol;

translating the data communications from the encoding of the reliable wireless data communications protocol to the encoding of the unreliable wireline data communications protocol further comprises translating the data communications from the WUSB encoding to the I²C encoding; and transmitting the data communications by the second translation device to a receiving device further comprises transmitting the data communications by the second translation device to a receiving device according to the I²C protocol.

9. The apparatus of claim 6 wherein:

the encoding of the unreliable wireline protocol comprises an encoding of digital bits as signal level transitions;

the encoding of the reliable wireless protocol comprises an encoding of digital bits as digital values;

translating, by the first translation device, the data communications from the encoding of the unreliable wireline protocol to an encoding of a reliable wireless protocol further comprises translating signal level transitions of the unreliable wireline protocol into digital values of the reliable wireless protocol; and translating, by the second translation device, the data communications from the encoding of the reliable wireless protocol to the encoding of the unreliable wireline protocol further comprises translating digital values of the reliable wireless protocol into signal level transitions of the unreliable wireline protocol.

10. The apparatus of claim 6 wherein:

at least one of the translation devices includes a data communications switch, the translation device that includes a data communications switch connected to a plurality of receiving devices that include the receiving device, each of the plurality of receiving devices separately connected to the translating device by a separate wireline data communications bus; and the method further comprises the transmitting device's instructing the translation device that includes a data communications switch to set the switch to direct communications from the transmitting device to the receiving device through the translation device that includes the data communications switch.

11. A computer program product for data communications among electronic devices within a computer, the computer program product disposed in a computer readable, recordable medium, the computer program product comprising computer program instructions capable of:

transmitting, from a transmitting device to a first translation device, data communications encoded according to an unreliable wireline data communications protocol, the transmitting device and the first translation device comprising electronic components of the computer, the transmitting device coupled for data communications to the first translation device by a wireline data communications bus;

translating, by the first translation device, the data communications from the encoding of the unreliable wireline data communications protocol to an encoding of a reliable wireless data communications protocol;

transmitting, by the first translation device to a second translation device, the data communications according to the reliable wireless data communications protocol;

translating, by the second translation device, the data communications from the encoding of the reliable wireless data communications protocol to the encoding of the unreliable wireline data communications protocol;

transmitting, by the second translation device to a receiving device, the data communications according to the unreliable wireline data communications protocol, the receiving device and the second translation device comprising electronic components of the computer, the receiving device coupled for data communications to the second translation device by a wireline data communications bus;

advising, the first translation device by the second translation device, that the second translation device, at the behest of the transmitting device, and the receiving device both hold low a signal level on a wireline between the second translation device and the receiving device; and holding low, by the first translation device, a corresponding wireline between the first translation device and the transmitting device until the second translation device advises that the receiving device no longer holds low the wireline between the second translation device and the receiving device.

12. The computer program product of claim 11 wherein:

the unreliable wireline data communications protocol is the Inter-Integrated Circuit ('I²C') protocol, the reliable wireless data communications protocol is the Wireless Universal Serial Bus ('WUSB') protocol, and the wireline data communications bus is an I²C bus;

the transmitting device is an I²C master device and the receiving device is an I²C slave device;

the first translation device exposes an I²C slave interface to the transmitting device and the second translation device exposes an I²C master interface to the receiving device; and the first translation device exposes a WUSB hub interface to the second translation device and the second translation device exposes a WUSB spoke interface to the first translation device.

13. The computer program product of claim 11 wherein:

the unreliable wireline data communications protocol is the Inter-Integrated Circuit ('I²C') protocol, the reliable wireless data communications protocol is the Wireless Universal Serial Bus ('WUSB') protocol, and the wireline data communications buses are I²C buses;

transmitting data communications from a transmitting device to a first translation device further comprises transmitting communications from a transmitting device to a first translation device according to the I²C protocol;

translating the data communications from the encoding of the unreliable wireline data communications protocol to an encoding of a reliable wireless data communications protocol further comprises translating the data communications from an I²C encoding to a wireless USB encoding;

transmitting the data communications by the first translation device to a second translation device further comprises transmitting the data communications by the first translation device to a second translation device according to the WUSB protocol;

translating the data communications from the encoding of the reliable wireless data communications protocol to the encoding of the unreliable wireline data communications protocol further comprises translating the data communications from the WUSB encoding to the I²C encoding; and transmitting the data communications by the second translation device to a receiving device further comprises transmitting the data communications by the second translation device to a receiving device according to the I²C protocol.

14. The computer program product of claim 11 wherein:

the encoding of the unreliable wireline protocol comprises an encoding of digital bits as signal level transitions;

the encoding of the reliable wireless protocol comprises an encoding of digital bits as digital values;

translating, by the first translation device, the data communications from the encoding of the unreliable wireline protocol to an encoding of a reliable wireless protocol further comprises translating signal level transitions of the unreliable wireline protocol into digital values of the reliable wireless protocol; and translating, by the second translation device, the data communications from the encoding of the reliable wireless protocol to the encoding of the unreliable wireline protocol further comprises translating digital values of the reliable wireless protocol into signal level transitions of the unreliable wireline protocol.

15. The computer program product of claim 11 wherein:

at least one of the translation devices includes a data communications switch, the translation device that includes a data communications switch connected to a plurality of receiving devices that include the receiving device, each of the plurality of receiving devices separately connected to the translating device by a separate wireline data communications bus; and the computer program product further comprises computer program instructions capable of causing the transmitting device to instruct the translation device that includes a data communications switch to set the switch to direct communications from the transmitting device to the receiving device through the translation device that includes the data communications switch.

* * * * *